Figure 1:
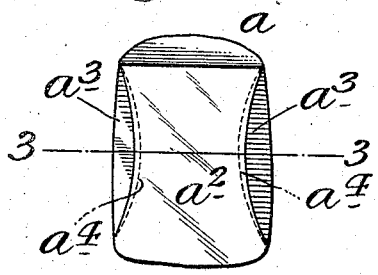

F. SHEINMAN.
ARTIFICIAL TOOTH.
APPLICATION FILED JUNE 19, 1908.

911,078.

Patented Feb. 2, 1909.

WITNESSES
M. C. Doody
C. E. Mulheany

INVENTOR
Frederick Sheinman
BY Edgar Tate &Co.
ATTORNEYS

UNITED STATES PATENT OFFICE.

FREDERICK SHEINMAN, OF NEW YORK, N. Y.

ARTIFICIAL TOOTH.

No. 911,078.  Specification of Letters Patent.  Patented Feb. 2, 1909.

Application filed June 19, 1908. Serial No. 439,272.

*To all whom it may concern:*

Be it known that I, FREDERICK SHEINMAN, a citizen of the United States, and residing at New York, in the county of New York and State of New York, have invented certain new and useful Improvements in Artificial Teeth, of which the following is a specification, such as will enable those skilled in the art to which it appertains to make and use the same.

This invention relates to artificial teeth or teeth facings, and the object thereof is to provide a device of this class which can be backed with metal and secured in position on a bridge or similar structure without the use of pins or similar devices at the back of the tooth or tooth facing.

The invention is fully disclosed in the following specification, of which the accompanying drawing forms a part, in which the separate parts of my improvement are designated by suitable reference characters in each of the views, and in which:—

Figure 2:
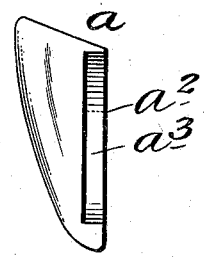
Figure 3:
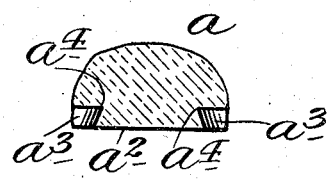
Figure 4:
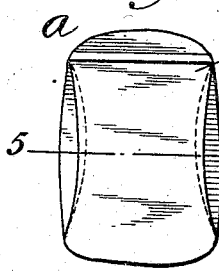
Figure 5:
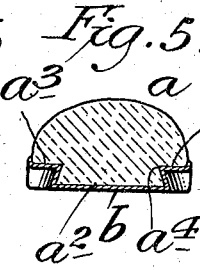
Figure 6:
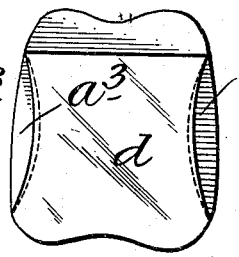
Figure 7:
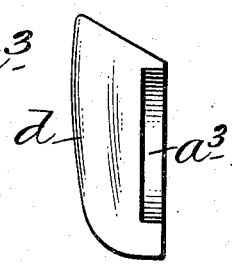
Figure 8:
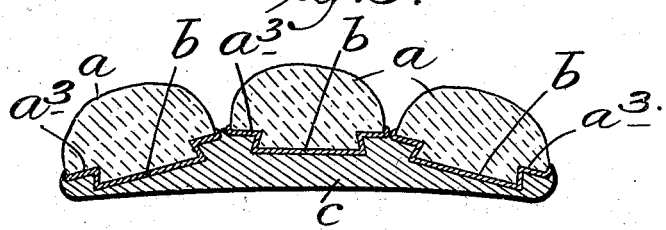

Figure 1 is a back view of an artificial tooth or tooth facing made according to my invention, Fig. 2 is a side view thereof, Fig. 3 a cross section on the line 3—3 of Fig. 1, Fig. 4 a view similar to Fig. 1 but showing a metal back applied to the tooth or tooth facing, Fig. 5 a cross section on the line 5—5 of Fig. 4, Fig. 6 a view similar to Fig. 1, but showing a different form of tooth, Fig. 7 a side view of the tooth shown in Fig. 6, and, Fig. 8 a transverse section showing a plurality of teeth secured to a bridge construction.

In the practice of my invention as shown in Figs. 1 to 5 inclusive, I take an artificial tooth or tooth facing $a$ of the usual or any preferred form, the tooth or tooth facing shown being what is known as a cuspid, and in the opposite sides of the back $a^2$ of said tooth or tooth facing I form longitudinal and segmental recesses $a^3$, the inner walls of which are under-cut as shown at $a^4$, and said recesses or the inner walls thereof are concave so as to prevent the tooth or tooth facing from slipping in a bridge construction, and the front walls thereof are parallel with the back face of the tooth or tooth facing, the recesses $a^3$ being formed in the side corners of the tooth or tooth facing and not in the back thereof only.

With the tooth or tooth facing prepared as shown in Figs. 1 to 3 inclusive, a soft metal backing $b$ shown in Figs. 4 and 5 may be easily applied to the back of the tooth or tooth facing, said metal backing being swaged into position and into the grooves $a^3$, and when the metal backing $b$ has been applied to the tooth or tooth facing as shown in Fig. 5 it is locked thereto and the said tooth or tooth facing may be placed in a matrix, and a bridge or other work cast thereon in the usual manner in order to give the tooth or tooth facing the desired strength and to secure said tooth or tooth facing to the bridge or other structure.

It will be understood that the metal backing $b$ is very thin and may be easily swaged to the back of the tooth or tooth facing and into the recesses $a^3$ with a suitable tool so as to securely hold said backing on the tooth or tooth facing, and this may be done by the manufacturer of the tooth or tooth facing, or by a dentist or other operator after the tooth or tooth facing has been secured by him.

In Fig. 8 I have shown a number of teeth $a$ secured to a bridge work construction $c$, and it will be understood that the operation performed in doing this is the same as with other teeth of this class. The teeth with the metal backing $b$ being first placed in a suitable mold or matrix into which the metal $c$ to form the bridge or similar construction is cast.

In Figs. 6 and 7 I have shown at $d$ what is known as a molar tooth, the back of which is provided with longitudinal grooves $a^3$ the same as in Figs. 1 to 5 inclusive.

It is a well known fact that the custom of securing pins or similar devices in the backs of artificial teeth or teeth facings frequently results in cracking or checking said teeth or facings, but with my improvement I avoid this difficulty, and at the same time provide an artificial tooth or tooth facing which may be rigidly and permanently secured in a bridge work or similar construction without danger of injury to the said teeth or facing.

My invention is also particularly adapted for use in forming bridge work or similar constructions, in which the artificial teeth or facings are rigidly and permanently secured in position and are not intended to be detachable.

Having fully described my invention, what I claim as new and desire to secure by Letters Patent, is:—

1. An artificial tooth or tooth facing, the back of which is provided in the opposite side portions thereof with longitudinal recesses having backwardly and laterally facing walls, the laterally facing walls being concave and under-cut.

2. An artificial tooth or tooth facing, the back of which is provided in the opposite side portions thereof with longitudinal recesses having backwardly and laterally facing walls, the laterally facing walls being concave and under-cut, said tooth or tooth facing being also provided with a thin metal back which is swaged thereto and into said recesses.

In testimony that I claim the foregoing as my invention I have signed my name in presence of the subscribing witnesses this 18th day of June, 1908.

FREDERICK SHEINMAN.

Witnesses:
A. R. APPLEMAN,
M. E. DOODY.